US009247585B2

(12) United States Patent
Sekiguchi et al.

(10) Patent No.: US 9,247,585 B2
(45) Date of Patent: Jan. 26, 2016

(54) CERAMIC HEATER ELEMENT, CERAMIC HEATER, AND GLOW PLUG

(75) Inventors: Yutaka Sekiguchi, Ichinomiya (JP); Yoshihito Ikai, Tsushima (JP); Takeshi Mitsuoka, Kounan (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 227 days.

(21) Appl. No.: 13/878,722

(22) PCT Filed: Nov. 29, 2011

(86) PCT No.: PCT/JP2011/006624
§ 371 (c)(1),
(2), (4) Date: Apr. 10, 2013

(87) PCT Pub. No.: WO2012/073476
PCT Pub. Date: Jun. 7, 2012

(65) Prior Publication Data
US 2013/0213954 A1 Aug. 22, 2013

(30) Foreign Application Priority Data
Dec. 2, 2010 (JP) ................................. 2010-269334

(51) Int. Cl.
*H05B 6/36* (2006.01)
*H05B 3/02* (2006.01)
*F23Q 7/00* (2006.01)
(Continued)

(52) U.S. Cl.
CPC *H05B 3/02* (2013.01); *F23Q 7/001* (2013.01); *H05B 3/141* (2013.01); *H05B 3/48* (2013.01); *H05B 2203/017* (2013.01); *H05B 2203/027* (2013.01)

(58) Field of Classification Search
USPC ........................................................ 219/542
See application file for complete search history.

(56) References Cited

U.S. PATENT DOCUMENTS

| 5,877,474 A * | 3/1999 | Konishi | 219/270 |
| 6,130,410 A * | 10/2000 | Kita | 219/270 |
| 6,204,481 B1 * | 3/2001 | Ito | 219/270 |

(Continued)

FOREIGN PATENT DOCUMENTS

| JP | 03-152893 A | 6/1991 |
| JP | 3044632 B2 | 5/2000 |

(Continued)

OTHER PUBLICATIONS

JP2009287920, Hotta, 2009—English Translation of Patent listed on IDS.*

*Primary Examiner* — Dana Ross
*Assistant Examiner* — Renee L Miller
(74) *Attorney, Agent, or Firm* — Sughrue Mion, PLLC

(57) ABSTRACT

A ceramic heater element 10 includes an insulating substrate 101, and a heating resistor 102 embedded in the insulating substrate 101. The insulating substrate 101 contains a main phase formed of β-SiAlON or a multiphase SiAlON of β-SiAlON and α-SiAlON; a grain boundary phase containing a rare earth element; and a silicide of at least one species selected from among Cr, W, Mo, V, and Fe. The heating resistor 102 contains a main phase formed of an electrically conductive compound containing at least one species selected from among silicide, nitride, and carbide of Mo, and silicide, nitride, and carbide of W; β-SiAlON or a multiphase SiAlON of β-SiAlON and α-SiAlON; and a grain boundary phase containing a rare earth element.

4 Claims, 2 Drawing Sheets

(51) Int. Cl.
*H05B 3/14* (2006.01)
*H05B 3/48* (2006.01)

(56) References Cited

U.S. PATENT DOCUMENTS

| | | | |
|---|---|---|---|
| 6,236,027 B1* | 5/2001 | Miyata et al. | 219/542 |
| 6,265,700 B1* | 7/2001 | Miyata et al. | 219/544 |
| 7,705,273 B2* | 4/2010 | Hotta et al. | 219/270 |
| 7,947,933 B2* | 5/2011 | Nagasako et al. | 219/544 |
| 2006/0011602 A1* | 1/2006 | Konishi et al. | 219/270 |
| 2007/0210053 A1 | 9/2007 | Hotta et al. | |
| 2008/0119349 A1* | 5/2008 | Abukawa et al. | 501/98.2 |
| 2008/0302777 A1* | 12/2008 | Ando | 219/270 |
| 2009/0194519 A1 | 8/2009 | Funaki et al. | |
| 2009/0320782 A1* | 12/2009 | Hiura | 123/145 A |
| 2010/0213188 A1* | 8/2010 | Nishihara et al. | 219/544 |
| 2011/0240625 A1* | 10/2011 | Takenouchi | 219/260 |

FOREIGN PATENT DOCUMENTS

| | | |
|---|---|---|
| JP | 2005-300046 A | 10/2005 |
| JP | 2006-024394 A | 1/2006 |
| JP | 2006-175561 A | 7/2006 |
| JP | 2007-335397 A | 12/2007 |
| JP | 2009-287920 A | 12/2009 |

* cited by examiner (a)

(b)

CERAMIC HEATER ELEMENT, CERAMIC HEATER, AND GLOW PLUG

CROSS REFERENCE TO RELATED APPLICATIONS

This application is a National Stage of International Application No. PCT/JP2011/006624 filed Nov. 29, 2011, claiming priority based on Japanese Patent Application No. 2010-269334 filed Dec. 2, 2010, the contents of all of which are incorporated herein by reference in their entirety.

TECHNICAL FIELD

The present invention relates to a ceramic heater element, a ceramic heater, and a glow plug.

BACKGROUND ART

Hitherto, heater elements have been used, for example, in a glow plug for facilitating start-up of a diesel engine, in a heater for igniting a burner, or in a heater for a gas sensor. Known heater elements include, for example, a metallic sheath heater element including a metallic sheath, heat-resistant insulating powder filled in the sheath, and a heating coil embedded in the powder; and a ceramic heater element including a substrate made of an insulating ceramic material, and a heating resistor made of an electrically conductive ceramic material and embedded in the substrate. Such a heater element is appropriately selected in consideration of the intended use thereof.

A known substrate used in a ceramic heater element contains, for example, a main phase formed of silicon nitride, a grain boundary phase for improving sinterability, and a material for adjusting the thermal expansion coefficient of the substrate so that it becomes nearly equal to the thermal expansion coefficient of a heating resistor for preventing occurrence of cracking due to thermal stress (hereinafter, the material may be referred to as "thermal-expansion-coefficient-adjusting material"). A known grain boundary phase contains, for example, a rare earth element. A known thermal-expansion-coefficient-adjusting material is, for example, a silicide of chromium.

Meanwhile, a known heating resistor used in a ceramic heater element contains, for example, a main phase formed of at least one species selected from among silicide, nitride, and carbide of Mo, and silicide, nitride, and carbide of W; silicon nitride; and a grain boundary phase for improving sinterability. A known grain boundary phase contains, for example, a rare earth element, as in the case of the grain boundary phase of a substrate (see, for example, Patent Document 1).

Such a ceramic heater element is required to consume less electric power and to exhibit excellent rapid heating ability. In order to suppress electric power consumption and to improve rapid heating ability, attempts have been made to improve the structure of such a ceramic heater element; for example, there have been proposed a method in which resistors having different resistances are employed in combination (see, for example, Patent Document 2), and a method in which the cross-sectional area of a heating material is reduced at a heat generation position (see, for example, Patent Document 3).

PRIOR ART DOCUMENT

Patent Document

Patent Document 1: Japanese Patent Application Laid-Open (kokai) No. 2007-335397

Patent Document 2: Specification of Japanese Patent No. 3044632

Patent Document 3: Japanese Patent Application Laid-Open (kokai) No. 2006-24394

SUMMARY OF THE INVENTION

Problems to be Solved by the Invention

However, a method in which resistors having different resistances are employed in combination requires a number of production steps, and thus tends to increase production cost. Meanwhile, a method in which the cross-sectional area of a heating material is reduced requires an excessive elevation in temperature of a resistor, and thus may cause poor energization durability. Thus, structural improvement poses problems in terms of productivity, durability, etc. Therefore, demand has arisen for suppression of electric power consumption and for improvement of rapid heating ability through a method other than those described above.

In addition to the aforementioned lower electric power consumption and rapid heating ability, a ceramic heater element is also required to exhibit, for example, good sinterability, thermal resistance, and high-temperature oxidation resistance. Conceivably, thermal resistance and high-temperature oxidation resistance are effectively improved by, for example, reducing the amount of a sintering aid. However, when the amount of a sintering aid is reduced, sinterability is likely to be impaired, and hot-press sintering must be carried out for densification. When hot-press sintering is carried out, the number of production steps increases, and production cost is likely to increase. Meanwhile, when the amount of a sintering aid is increased, sinterability may be improved, and pressureless sintering or gas pressure sintering, which can reduce the number of production steps, may be carried out. However, in this case, thermal resistance or high-temperature oxidation resistance is likely to be impaired.

The present invention has been accomplished for solving the aforementioned problems. An object of the present invention is to provide a ceramic heater element which consumes less electric power, which has excellent rapid heating ability, and which exhibits good productivity, high-temperature properties, etc. Another object of the present invention is to provide a ceramic heater or a glow plug, each of which includes the ceramic heater element.

Means for Solving the Problems

The present invention provides a ceramic heater element comprising an insulating substrate, and a heating resistor embedded in the insulating substrate. The insulating substrate is characterized by containing a main phase formed of $\beta$-SiAlON or a multiphase SiAlON of $\beta$-SiAlON and $\alpha$-SiAlON; a grain boundary phase containing a rare earth element; and a silicide of at least one species selected from among Cr, W, Mo, V, and Fe. The heating resistor is characterized by containing a main phase formed of an electrically conductive compound containing at least one species selected from among silicide, nitride, and carbide of Mo, and silicide, nitride, and carbide of W; $\beta$-SiAlON or a multiphase SiAlON of $\beta$-SiAlON and $\alpha$-SiAlON; and a grain boundary phase containing a rare earth element.

The present invention also provides a ceramic heater comprising a ceramic heater element, and a metallic sheath including therein the ceramic heater element such that the front end of the ceramic heater element projects from the sheath, characterized in that the ceramic heater element is the aforementioned ceramic heater element of the present invention.

The present invention also provides a glow plug comprising a ceramic heater, and a tubular metallic shell including therein a rear end portion of the ceramic heater, characterized in that the ceramic heater is the aforementioned ceramic heater of the present invention.

Effects of the Invention

Since the ceramic heater element of the present invention includes an insulating substrate and a heating resistor, each of which has a specific composition, the ceramic heater element consumes less electric power, has excellent rapid heating ability, and exhibits good productivity, high-temperature properties, etc. Also, since the ceramic heater or glow plug of the present invention includes the ceramic heater element of the present invention, the ceramic heater or the glow plug consumes less electric power, has excellent rapid heating ability, and exhibits good productivity, high-temperature properties, etc.

MODES FOR CARRYING OUT THE INVENTION $$15-1

Embodiments of the present invention will next be described.
$$15-2

Figure 1:
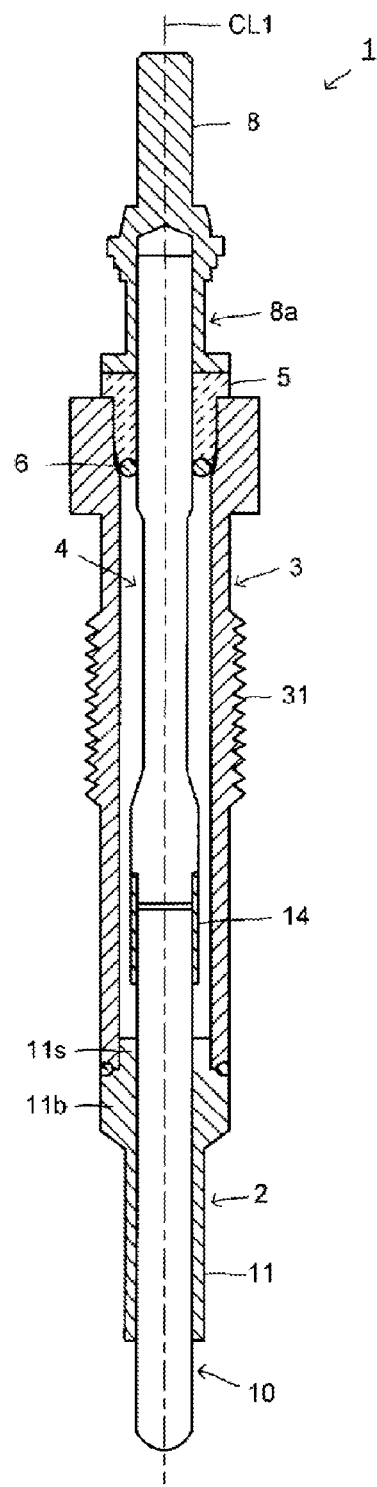
FIG. 1 is a cross-sectional view of an example of a glow plug including the ceramic heater element of the present invention.
Figure 1:
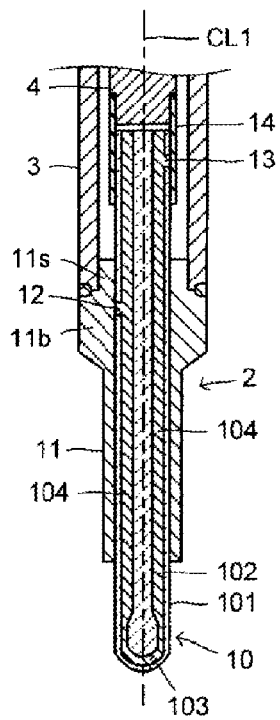

FIG. 1 shows an example of a glow plug including the ceramic heater element (hereinafter may be referred to simply as "heater element") of the present invention. FIG. 1(*a*) is a vertical cross-sectional view of the entire glow plug, and FIG. 1(*b*) is a cross-sectional view of a portion of the ceramic heater element.

The glow plug 1 includes a ceramic heater 2, and a tubular metallic shell 3 holding therein a rear end portion of the ceramic heater 2. A threaded portion 31 is formed on the outer surface of the metallic shell 3, and the threaded portion 31 serves as an attachment portion for fixing the glow plug 1 to a non-illustrated engine block. In the interior of the metallic shell 3, a metallic rod 4 for supplying electric power to the ceramic heater 2 from the rear end side is provided so as to be insulated from the metallic shell 3. An insulating bush 5 formed of an insulating material is provided between the outer surface (on the rear end side) of the metallic rod 4 and the inner surface of the metallic shell 3. In order to improve the hermetic sealing of the interior of the metallic shell 3, an O-ring 6 formed of an insulating material (e.g., rubber) is provided on the front end side of the insulating bush 5 such that the O-ring 6 abuts the inner hole of the metallic shell 3, the metallic rod 4, and the insulating bush 5.

The rear end portion of the metallic rod 4 projects from the rear end of the metallic shell 3, and a terminal shell 8 is fitted onto the projected portion via the insulating bush 5. The terminal shell 8 is conductively fixed to the outer surface of the metallic rod 4 by means of a circumferential clamping portion 8*a*.

The ceramic heater 2 includes the heater element 10 of the present invention, and a metallic sheath 11 holding therein the heater element 10 such that the front end portion of the element projects from the sheath. The metallic shell 3 and the metallic sheath 11 are fixed to each other as follows. For example, a small-diameter portion 11*s* (on the rear end side) of the metallic sheath 11 is pressed into the front end portion of the inner hole of the metallic shell 3, and a central large-diameter portion 11*b* of the metallic sheath 11 is fixed to the entire front end of the metallic shell 3 through laser welding.

The heater element 10 of the present invention assumes a rod-like shape, and includes an insulating substrate 101 and a heating resistor 102 embedded therein. The heating resistor 102 includes a U-shaped heating portion 103 provided on the front end side of the heater element 10, and a pair of straight lead portions 104 which are connected to both ends of the heating portion 103 and extend in the direction of an axis CL1 of the heater element 10. One of the lead portions 104 is electrically connected to the metallic shell 3 via the metallic sheath 11 by means of a radially extruded, grounding electricity-supplying terminal portion 12. The other lead portion 104 is electrically connected to a metallic ring 14 fitted into the rear end portion of the heater element 10 by means of a radially extruded, power-supply-side electricity-supplying terminal portion 13. The ring 14 is fixed and electrically connected to the front end portion of the metallic rod 4 through, for example, welding. With this configuration, electric power is supplied to the heater element 10.

A characteristic feature of the heater element 10 of the present invention resides in that the insulating substrate 101 contains a main phase formed of β-SiAlON or a multiphase SiAlON of β-SiAlON and α-SiAlON; a grain boundary phase containing a rare earth element; and a silicide of at least one species selected from among Cr, W, Mo, V, and Fe. Another characteristic feature of the heater element 10 resides in that the heating resistor 102 contains a main phase formed of an electrically conductive compound containing at least one species selected from among silicide, nitride, and carbide of Mo, and silicide, nitride, and carbide of W; β-SiAlON or a multiphase SiAlON of β-SiAlON and α-SiAlON; and a grain boundary phase containing a rare earth element.

Since the main phase of the insulating substrate 101 and the insulating component of the heating resistor 102 are formed of SiAlON, the heater element 10 consumes less electric power and exhibits improved rapid heating ability. Specifically, since SiAlON has a thermal conductivity lower than that of silicon nitride, heat generated from the heater element 10 can be prevented from escaping to members for fixing the heater element 10. Therefore, effective heating can be attained; i.e., electric power consumption can be suppressed, and rapid heating ability can be improved.

When the main phase of the insulating substrate 101, etc. are formed of silicon nitride as in the case of conventional heater elements, since silicon nitride has high thermal conductivity, effective heating may fail to be attained; i.e., electric power consumption may be increased, and rapid heating ability may be impaired. When pressureless sintering or gas pressure sintering, which is effective for cost reduction, is employed, a large amount of a sintering aid for improving sinterability (in particular, density) must be added, which tends to cause impairment of oxidation resistance. Meanwhile, when the amount of a sintering aid is reduced in consideration of oxidation resistance, sinterability is reduced, and strength is lowered. Although employment of hot-press sintering is effective for improving both oxidation resistance and sinterability, this technique requires a number of production steps, and thus increases production cost. The thermal conductivities (reference values) of silicon nitride and SiAlON as measured at room temperature are 30 to 100 W/mK and 10 to 20 W/mK, respectively.

When the main phase of the insulating substrate 101, etc. are formed of SiAlON, both oxidation resistance and sinterability can be improved, and good productivity can be achieved. When both the main phase of the insulating substrate 101 and the insulating component of the heating resistor 102 are formed of SiAlON, the sintering behavior and thermal contraction of the insulating substrate 101 can be matched with those of the heating resistor 102. Therefore, during production of the heater element (particularly during sintering of the heater element), cutting or breakage of the heating resistor 102 can be suppressed, and occurrence of exfoliation, etc. can be suppressed at the interface between the insulating substrate 101 and the heating resistor 102. When in use, the heater element exhibits improved durability against repeated temperature elevation. Particularly when the insulating substrate 101 contains a silicide of at least one species selected from among Cr, W, Mo, V, and Fe, the thermal expansion coefficient of the insulating substrate 101 becomes nearly equal to that of the heating resistor 102, and the heater element exhibits improved durability against repeated temperature elevation.
$$24-1

The insulating substrate 101 and the heating resistor 102 will next be described in detail.
$$24-2

As described above, the insulating substrate 101 contains a main phase formed of β-SiAlON or a multiphase SiAlON of β-SiAlON and α-SiAlON. As used herein, the term "main phase" refers to a constituent phase having the largest mass. Similar to the case of the insulating substrate 101, the heating resistor 102 contains β-SiAlON or a multiphase SiAlON of β-SiAlON and α-SiAlON.

SiAlON is produced through formation of a solid solution of an aid component in the $Si_3N_4$ lattice, and SiAlON is present in two forms: β-SiAlON represented by the compositional formula $Si_{6-z}Al_zO_zN_{8-z}$ (0<Z≤4.2), and α-SiAlON represented by the compositional formula $Mx(Si,Al)_{12}(O,N)_{16}$ (0<X≤2, M represents Li, Mg, Ca, Y, or R (R is a rare earth element, exclusive of La and Ce)).

During sintering of such SiAlON, firstly, a liquid phase containing a sintering aid as a main component is formed, and then densification is promoted. Thereafter, a component of grain boundary phase is incorporated into the $Si_3N_4$ lattice at a late stage of sintering. Therefore, the thus-sintered SiAlON contains a grain boundary phase in an amount smaller than that in the case of common silicon nitride, and exhibits excellent high-temperature oxidation resistance.

Similar to the case of silicon nitride, β-SiAlON has a structure in which acicular grains are complicatedly entangled with one another, and thus exhibits high strength and toughness. Meanwhile, α-SiAlON has an equiaxed grain structure and thus exhibits low toughness, but exhibits hardness higher than that of β-SiAlON. During production of α-SiAlON, not only Al (i.e., grain boundary phase component) but also Yb or the like (Li, Mg, Ca, Y, or R (R is a rare earth element, exclusive of La and Ce)) forms a solid solution in grains. Therefore, through production of α-SiAlON, the amount of the grain boundary phase is further reduced, and oxidation resistance is improved. However, when the insulating element is formed of only α-SiAlON, the grain boundary phase component is incorporated into SiAlON during sintering, and virtually no grain boundary phase component remains, resulting in failure to form a dense sintered compact. Thus, the insulating element exhibiting excellent sinterability, high oxidation resistance, and high strength can be formed through production of both β-SiAlON and α-SiAlON grains.

No particular limitation is imposed on the percent α-SiAlON content (hereinafter may be referred to as "percent α content") of the total of β-SiAlON and α-SiAlON contained in the insulating substrate 101. However, when the percent α content is low, the amount of the grain boundary phase increases, and thus oxidation resistance is likely to be impaired. Therefore, the percent α content is preferably 2% or more. In contrast, when the percent α content is high, the grain boundary phase component is incorporated into SiAlON during sintering, and virtually no grain boundary phase component remains, resulting in failure to form a dense sintered compact. As a result, strength and durability against repeated temperature elevation are likely to be lowered. Therefore, the percent α content is preferably 60% or less. In order to further improve strength and durability against repeated temperature elevation, the percent α content is preferably 50% or less, more preferably 30% or less.

The insulating substrate 101 is provided outside of the heating resistor 102, and is required to have oxidation resistance higher than that of the heating resistor 102. Therefore, in order to improve both strength, etc. and oxidation resistance in the entire heater element 10, the percent α content of the insulating substrate 101 is preferably higher than that in the heating resistor 102. Specifically, preferably, the percent α content of the insulating substrate 101 falls within the aforementioned range; i.e., 2 to 50% (more preferably 2 to 30%), and is higher than that in the heating resistor 102.

Percent α content is calculated by the following formula: $(α1+α2)/(β1+β2+α1+α2)$ (wherein β1 represents the (101) plane peak intensity of β-SiAlON in an X-ray diffraction diagram; β2 represents the (210) plane peak intensity of β-SiAlON in the diagram; α1 represents the (102) plane peak intensity of α-SiAlON in the diagram; and α2 represents the (210) plane peak intensity of α-SiAlON in the diagram).

No particular limitation is imposed on the Z value, which represents the amount of an alumina solid solution in β-SiAlON contained in the insulating substrate 101. However, in order to attain sufficient sinterability, the Z value is preferably 0.1 or more, more preferably 0.3 or more. When the Z value is large; i.e., the amount of an alumina solid solution in β-SiAlON increases, the properties of β-SiAlON become similar to those of alumina, and β-SiAlON is stabilized, whereby sinterability is improved. However, the strength of β-SiAlON itself is lowered, and durability against repeated temperature elevation, etc. are impaired. Therefore, the Z value is preferably 1.3 or less, more preferably 1.0 or less, particularly preferably 0.8 or less.

Z value is calculated on the basis of the difference between the α-axis lattice constant (7.60442 Å) of β-silicon nitride and the α-axis lattice constant of β-SiAlON in the SiAlON phase as measured through X-ray diffractometry (the calculation method is described in, for example, page 28 of WO 02/44104).

The grain boundary phase in the insulating substrate 101 is formed through the following process: a sintering aid added for promoting sintering is liquefied and contributes to formation, rearrangement, and growth of SiAlON grains, and then the sintering aid is solidified during cooling, to thereby form a glass or crystalline phase. The grain boundary phase contains a rare earth element; specifically, one or more species selected from among Sc, Y, La, Ce, Pr, Nd, Sm, Eu, Gd, Tb, Dy, Ho, Er, Tm, Yb, and Lu. The grain boundary phase preferably contains at least one species selected from among Sc, Y, Dy, Er, Yb, and Lu, since such an element promotes crystallization of the grain boundary phase, improves high-temperature strength, and facilitates adjustment of percent α content. Particularly preferably, the grain boundary phase contains at least one species selected from among Y, Er, and Yb.

No particular limitation is imposed on the amount of the grain boundary phase in the insulating substrate 101. However, when the amount of a sintering aid is small; i.e., the amount of the grain boundary phase is small, the amount of a liquid phase becomes insufficient during sintering, and thus sinterability is lowered. In addition, microvoids are generated in the grain boundary phase, and thus strength tends to be lowered. Meanwhile, when the amount of the grain boundary phase is large, thermal resistance is likely to be lowered, since the melting point of the grain boundary phase is lower than that of SiAlON. Therefore, the amount of a rare earth element (as converted to its oxide) contained in the entire raw material employed for producing the insulating substrate 101 is preferably adjusted to 1 to 15 mass %, so that an appropriate amount of the grain boundary phase is formed in the insulating substrate 101.

A silicide is incorporated into the insulating substrate 101 for the purpose of adjusting the thermal expansion coefficient of the insulating substrate 101. Specifically, a silicide is incorporated into the insulating substrate 101 so that the thermal expansion coefficient of the insulating substrate 101 becomes nearly equal to that of the heating resistor 102 for improving durability against repeated temperature elevation. The silicide contained in the insulating substrate 101 is a silicide of at least one species selected from among Cr, W, Mo, V, and Fe, and is generally in the form of grains dispersed in the insulating substrate 101. The silicide is formed through silicification of, for example, an oxide of Cr, W, Mo, V, or Fe during sintering.

The amount of the silicide contained in the insulating substrate 101 is preferably 0.1 to 8 vol. % with respect to the entirety of the substrate 101. When the amount of the silicide is 0.1 vol. % or more, the thermal expansion coefficient of the insulating substrate 101 can be effectively adjusted so as to become nearly equal to that of the heating resistor 102, and durability against repeated temperature elevation can be improved. Meanwhile, when the amount of the silicide is 8 vol. % or less, lowering of strength, which would otherwise be caused by incorporation of an excessive amount of the silicide, can be suppressed. In order to improve both strength and durability against repeated temperature elevation, the amount of the silicide is preferably 0.5 to 4 vol. %, more preferably 0.5 to 3 vol. %.

The volume fraction of the silicide can be determined as follows. Specifically, a cross section of the insulating substrate 101 is mirror-polished; the image of the cross section obtained by means of a scanning electron microscope (SEM) is subjected to image analysis, to thereby calculate the percent area of silicide grains; and the percent theoretical volume is pseudo-calculated on the basis of the percent area.

The heating resistor 102 contains a main phase formed of an electrically conductive compound containing at least one species selected from among silicide, nitride, and carbide of Mo, and silicide, nitride, and carbide of W. Since the heating resistor contains a main phase formed of such an electrically conductive compound, the resistor exhibits such a sufficient thermal resistance that it can be employed at a high temperature of 1200° C. or higher. The electrically conductive compound is particularly preferably WC, $WSi_2$, or $MoSi_2$.

No particular limitation is imposed on the amount of the electrically conductive compound contained in the heating resistor 102, but the amount is preferably 15 to 35 vol. % with respect to the entirety of the heating resistor 102. When the amount of the electrically conductive compound is 15 vol. % or more, reduction of the amount of heat generation, etc., which would otherwise be caused by excessively low electrical conductivity, can be suppressed. Meanwhile, when the amount of the electrically conductive compound is 35 vol. % or less, reduction of the amount of heat generation, etc., which would otherwise be caused by, for example, excessively high electrical conductivity, can be suppressed, and sufficient densification can be attained through sintering, whereby the difference in thermal expansion coefficient between the heating resistor 102 and the insulating substrate 101 can be reduced. The amount of the electrically conductive compound is more preferably 20 to 30 vol. % with respect to the entirety of the heating resistor 102.

The heating resistor 102 contains, as an insulating component, β-SiAlON or a multiphase SiAlON of β-SiAlON and α-SiAlON. When the insulating component of the heating resistor 102 is β-SiAlON or a multiphase SiAlON of β-SiAlON and α-SiAlON as in the case of the main phase of the insulating substrate 101, the sintering behavior and thermal contraction of the heating resistor 102 can be matched with those of the insulating substrate 101, and, during sintering, cutting or breakage of the heating resistor 102 can be suppressed, and occurrence of exfoliation, etc. can be suppressed at the interface between the insulating substrate 101 and the heating resistor 102. Also, the heater element exhibits improved durability against repeated temperature elevation.

No particular limitation is imposed on the percent α-SiAlON content (percent α content) of the total of β-SiAlON and α-SiAlON contained in the heating resistor 102. However, when the percent α content is high, sinterability is lowered, resulting in low density, and strength and durability against repeated temperature elevation are likely to be lowered. Therefore, the percent α content is preferably 60% or less. In order to further improve strength and durability against repeated temperature elevation, the percent α content is preferably 50% or less, more preferably 10% or less, particularly preferably 5% or less. Since the heating resistor 102 is embedded in the insulating substrate 101, the heating resistor 102 is not necessarily required to have oxidation resistance comparable to that of the insulating substrate 101. Therefore, the percent α content may be low, and may be 0%.

As described above, the heating resistor 102 is embedded in the insulating substrate 101, and thus is not necessarily required to have oxidation resistance comparable to that of the insulating substrate 101. Preferably, the heating resistor 102 exhibits high strength, etc., rather than oxidation resistance. Therefore, the percent α content of the heating resistor 102 is preferably lower than that in the insulating substrate 101. Specifically, preferably, the percent α content of the heating resistor 102 falls within the aforementioned range; i.e., 60% or less (more preferably 50% or less, much more preferably 10% or less), and is lower than that in the insulating substrate 101.

No particular limitation is imposed on the Z value in β-SiAlON contained in the heating resistor 102. However, in order to attain sufficient sinterability, the Z value is preferably 0.1 or more. When the Z value is large; i.e., the amount of an alumina solid solution in β-SiAlON increases, the properties of β-SiAlON become similar to those of alumina, and β-SiAlON is stabilized, whereby sinterability is improved. However, the strength of β-SiAlON itself is lowered, and durability against repeated temperature elevation is impaired.

Therefore, the Z value is preferably 1.3 or less, more preferably 1.0 or less, particularly preferably 0.7 or less.

Similar to the case of the grain boundary phase in the insulating substrate 101, the grain boundary phase in the heating resistor 102 is formed through the following process: a sintering aid added for promoting sintering is liquefied and contributes to formation, rearrangement, and growth of SiAlON grains, and then the sintering aid is solidified during cooling, to thereby form a glass or crystalline phase. The grain boundary phase contains at least a rare earth element; specifically, one or more species selected from among Sc, Y, La, Ce, Pr, Nd, Sm, Eu, Gd, Tb, Dy, Ho, Er, Tm, Yb, and Lu. The grain boundary phase preferably contains at least one species selected from among Sc, Y, Dy, Er, Yb, and Lu, since such an element promotes crystallization of the grain boundary phase, improves high-temperature strength, and facilitates adjustment of percent α content. Particularly preferably, the grain boundary phase contains at least one species selected from among Y, Er, and Yb.

No particular limitation is imposed on the amount of the grain boundary phase in the heating resistor 102. However, similar to the case of the insulating substrate 101, the amount of a rare earth element (as converted to its oxide) contained in the entire raw material employed for producing the heating resistor 102 is preferably adjusted to 1 to 15 mass %.

$$46-1

The aforementioned heater element 10 may be produced, for example, as follows.

$$46-2

Figure 2:
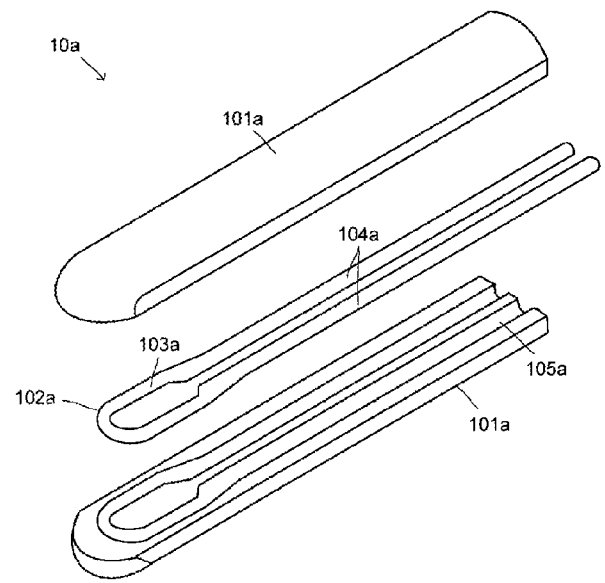
FIG. 2 is an exploded perspective view of an element-forming compact to become a heater element through sintering.

FIG. 2 is an exploded perspective view of an element-forming compact 10a to become the heater element 10 through sintering. The element-forming compact 10a includes a resistor-forming compact 102a to become the heating resistor 102 through sintering, and an insulating substrate-forming compact 101a to become the insulating substrate 101 through sintering.

For production of the resistor-forming compact 102a, powder of an electrically conductive compound; i.e., powder of at least one species selected from among silicide, nitride, and carbide of Mo, and silicide, nitride, and carbide of W, is wet-mixed with powder containing a constituent element of SiAlON (hereinafter the powder may be referred to as "SiAlON-forming powder"); i.e., silicon nitride powder, alumina powder, aluminum nitride powder, etc., and with a sintering aid; i.e., powder of an oxide of one or more rare earth elements selected from among Sc, Y, La, Ce, Pr, Nd, Sm, Eu, Gd, Tb, Dy, Ho, Er, Tm, Yb, and Lu.

The electrically conductive compound powder is preferably, for example, WC, $WSi_2$, or $MoSi_2$. The sintering aid is preferably powder of an oxide of one or more rare earth elements selected from among Sc, Y, Dy, Er, Yb, and Lu. No particular limitation is imposed on the proportions of the respective raw material powders in the entire powdery raw material. However, for example, the amounts of the electrically conductive compound powder, the SiAlON-forming powder, and the rare earth oxide powder are preferably 55 to 70 mass %, 25 to 40 mass %, and 1 to 15 mass %, respectively. Each raw material powder preferably has a mean particle size of 5 μm or less, more preferably 3 μm or less, much more preferably 1 μm or less.

The slurry mixture prepared through wet mixing is dried and granulated through spray drying. The powder obtained through this drying is mixed and kneaded with a binder in a kneader. By means of an injection molding machine, the thus-kneaded product is formed into a U-shaped three-dimensional structure as shown in FIG. 2; i.e., the resistor-forming compact 102a to become the heating resistor 102 through sintering.

For production of the insulating substrate-forming compact 101a, SiAlON-forming powder; i.e., silicon nitride powder, alumina powder, aluminum nitride powder, etc., is wet-ground and mixed with powder for silicide; i.e., powder of a compound (e.g., oxide) of at least one element selected from among Cr, W, Mo, V, and Fe, and with a sintering aid; i.e., powder of an oxide of one or more rare earth elements selected from among Sc, Y, La, Ce, Pr, Nd, Sm, Eu, Gd, Tb, Dy, Ho, Er, Tm, Yb, and Lu. Thereafter, a binder is added to the resultant mixture, and the mixture is spray-dried, to thereby prepare powder for the insulating substrate. The insulating substrate powder is subjected to press molding by means of a molding machine having a specific die, to thereby form a half insulating-substrate-forming compact 101a as shown in FIG. 2, which covers one side surface (e.g., lower side surface shown in FIG. 2) of the resistor-forming compact 102a. The half insulating-substrate-forming compact 101a has a dent 105a having a shape corresponding to that of the resistor-forming compact 102a.

The sintering aid is preferably powder of an oxide of one or more rare earth elements selected from among Sc, Y, Dy, Er, Yb, and Lu. No particular limitation is imposed on the proportions of the respective raw material powders in the entire powdery raw material. However, for example, the amounts of the SiAlON-forming powder, the powder for silicide, and the rare earth oxide powder are preferably 85 to 97 mass %, 0.5 to 5 mass %, and 1 to 15 mass %, respectively. Each raw material powder preferably has a mean particle size of 5 μm or less, more preferably 3 μm or less, much more preferably 1 μm or less.

Figure 3:
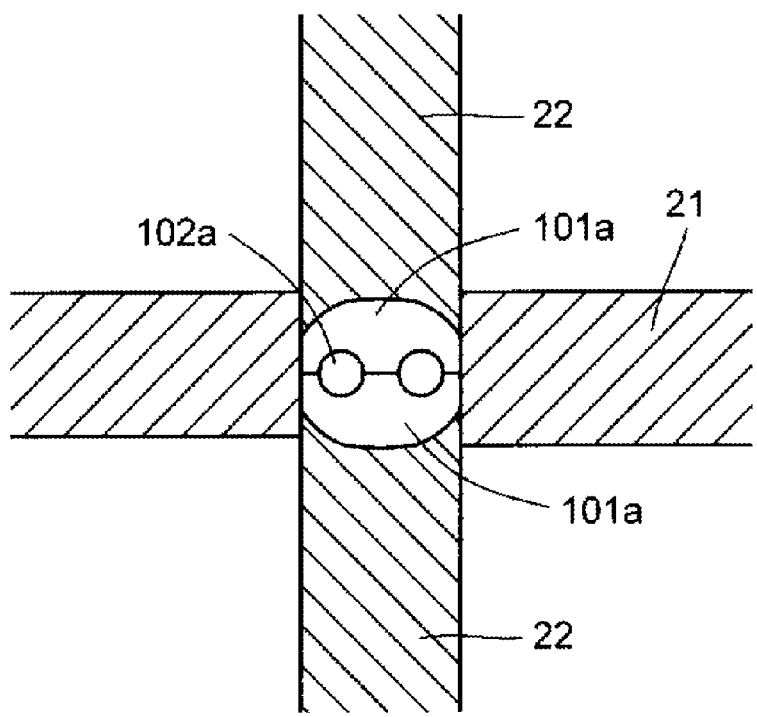
FIG. 3 shows a method for producing the element-forming compact shown in FIG. 2.

Subsequently, as shown in FIG. 3, the aforementioned half insulating-substrate-forming compact 101a is placed in a die 21, and the resistor-forming compact 102a is placed in the dent 105a of the compact 101a. Then, insulating substrate powder similar to that employed for forming the half insulating-substrate-forming compact 101a is filled into the die 21 containing the compact 101a, and press molding is carried out by means of a pair of punches 22. Thus, the other half insulating-substrate-forming compact 101a is formed, and also the compacts 101a are integrated together, to thereby produce the element-forming compact 10a to become the heater element 10 through sintering.

The element-forming compact 10a is calcined at about 600 to about 800° C. for removing the binder component. The thus-calcined element-forming compact 10a is optionally subjected to cold isostatic pressing (CIP). Cold isostatic pressing (CIP) is carried out by, for example, enclosing the element-forming compact 10a in a rubber tube, and hydrostatic pressure is applied to the tube by means of a liquid molding medium such as oil or water.

Thereafter, the element-forming compact 10a is subjected to sintering. The sintering technique employed may be, for example, pressureless sintering, gas pressure sintering, HIP sintering, or hot-press sintering. Among these sintering techniques, pressureless sintering is very useful, since it can treat a large amount of material and can be carried out at low cost. Pressureless sintering is carried out, for example, in a non-oxidative atmosphere at 1,500 to 1,800° C. and a pressure of 0.1 MPa (preferably at a nitrogen partial pressure of 0.05 MPa or more).

Gas pressure sintering is carried out in a non-oxidative atmosphere at 1,500 to 1,950° C. and a gas pressure of 0.1 to 1 MPa (preferably at a nitrogen partial pressure of 0.05 MPa or more). In a HIP sintering process, primary sintering is carried out through pressureless sintering or gas pressure sintering, and then secondary sintering is carried out in a nitrogen atmosphere at 1,450 to 1,900° C. and a gas pressure of 1 to 200 MPa (preferably at a nitrogen partial pressure of 0.05 MPa or more). Hot-press sintering is carried out in a non-oxidative atmosphere (0.1 to 1 MPa) at 1,450 to 1,900° C. under uniaxial pressure conditions (hot-press pressure: 10 to 50 MPa) (preferably at a nitrogen partial pressure of 0.05 MPa or more).

The percent α content or the Z value of SiAlON contained in the insulating substrate 101 or the heating resistor 102 may be adjusted by appropriately regulating, for example, the proportions of the respective raw material powders or the sintering temperature so as to fall within the aforementioned range. For example, adjustment of percent α content may be generally carried out by use of a sintering aid. Preferably, for example, adjustment of percent α content is carried out by employing, as a sintering aid, powder of an oxide of at least one rare earth element selected from among Sc, Y, Dy, Er, Yb, and Lu, $Al_2O_3$ powder, or AlN powder, and regulating the amount of the powder added. More specifically, adjustment of percent α content may be carried out by balancing the total amounts of Si, Al, O, N, and rare earth elements derived from $Si_3N_4$, $SiO_2$ on the surface of $Si_3N_4$, rare earth oxides, $Al_2O_3$, AlN, and other sintering aids. Generally, percent α content can be reduced by increasing the $Al_2O_3$/AlN ratio, whereas percent α content can be increased by reducing the $Al_2O_3$/AlN ratio.

Adjustment of Z value may be carried out by, for example, regulating the proportions of $Al_2O_3$ and AlN contained in the raw material employed, or increasing/decreasing the total amount of $Al_2O_3$ and AlN with respect to the amount of the entire raw material. Generally, Z value can be reduced by increasing the $Al_2O_3$/AlN ratio or reducing the total amount of $Al_2O_3$ and AlN, whereas Z value can be increased by reducing the $Al_2O_3$/AlN ratio or increasing the total amount of $Al_2O_3$ and AlN.

The above-fired product is further subjected to, for example, polishing so that the thus-finished product has a specific shape, to thereby produce the heater element 10 including the insulting substrate 101 and the heating resistor 102 embedded therein, wherein each of the insulting substrate 101 and the heating resistor 102 has a specific composition.

EXAMPLES

The present invention will next be described in detail by way of Examples.

Examples 1 to 22 and Comparative Examples 1 to 5

By means of a ball mill, one or two species selected from among WC, $WSi_2$, $MoSi_2$, and TiN, serving as electrically conductive compound powder(s) (mean particle size: 0.5 to 1 μm) were wet-mixed with $Si_3N_4$, $Al_2O_3$, and AlN, serving as SiAlON-forming powders (mean particle size: 0.5 to 1 μm), with one or two species selected from among $Y_2O_3$, $La_2O_3$, $Er_2O_3$, and $Yb_2O_3$, serving as a sintering aid(s) (mean particle size: 0.5 to 1 μm), and with $SiO_2$ (mean particle size: 0.5 to 1 μm) for 24 hours. The compositional proportions of the respective raw material powders are regulated so that the volume fraction of the electrically conductive compound is adjusted to 24 to 28 vol. % as shown in Table 1.

For example, the powder for the heating resistor of Example 1 was prepared by employing WC powder as electrically conductive compound powder, and also employing $Si_3N_4$, $Yb_2O_3$, $Al_2O_3$, AlN, and $SiO_2$ powders. $Yb_2O_3$, $Al_2O_3$, AlN, or $SiO_2$ serves as a sintering aid, and forms a solid solution in $Si_3N_4$ during sintering, to thereby form SiAlON. SiAlON is readily formed by employing, as an Al component, AlN in addition to $Al_2O_3$.

In order to increase Z value as in the case of Example 10, the amounts of $Al_2O_3$ and AlN are increased (the ratio by mass of $Al_2O_3$+AlN to $Si_3N_4$ is adjusted to about 15/100 to about 30/100), and the ratio $Al_2O_3$/AlN is adjusted to about 0.5 to about 10. In order to adjust Z value to 0 as in the case of Comparative Example 1, only $Al_2O_3$ is employed as an Al component (i.e., AlN is not incorporated) or no Al component is employed, and the amount of Al is reduced with respect to $Si_3N_4$ (the ratio by mass of Al (as converted to $Al_2O_3$) to $Si_3N_4$ is adjusted to about 3/100 or less). In order to form α-SiAlON as in the case of Example 8, the ratio $Al_2O_3$/AlN is reduced (to 2 or less). The lower the ratio $Al_2O_3$/AlN, the higher the percent α content.

The slurry mixture prepared through wet mixing was dried through spray drying, and then the powder obtained through this drying was mixed and kneaded with a binder in a kneader for eight hours. Subsequently, the thus-kneaded product was formed into a U-shaped three-dimensional structure by means of an injection molding machine, to thereby produce a resistor-forming compact to become a heating resistor through sintering.

Separately, by means of a ball mill, $Si_3N_4$, $Al_2O_3$, and AlN, serving as powders for insulating substrate, were wet mixed with one or two species selected from among $Cr_2O_3$, $CrSi_2$, $WO_3$, $WSi_2$, $MoO_2$, $MoSi_2$, $V_2O_5$, and $VSi_2$, serving as a thermal-expansion-coefficient-adjusting material(s) (e.g., powder(s) for silicide), and with one or two species selected from among $Y_2O_3$, $La_2O_3$, $Er_2O_3$, and $Yb_2O_3$, serving as a sintering aid(s) for 40 hours. Thereafter, a binder was added to the resultant mixture, followed by spray drying, to thereby prepare a powder mixture.

In order to adjust Z value to 0 as in the case of Comparative Example 1, only $Al_2O_3$ is employed as an Al component (i.e., AlN is not incorporated), and the amount of Al is reduced with respect to the entire raw material (the amount of Al is adjusted to about 3 wt. % or less as converted to $Al_2O_3$). Meanwhile, in order to increase Z value as in the case of Example 4, the total amount of $Al_2O_3$ and AlN is increased (to about 10 to about 20 wt. %), and the ratio $Al_2O_3$/AlN is adjusted to about 0.5 to about 10. In order to adjust percent α content to 0 as in the case of Example 2, the ratio $Al_2O_3$/AlN is increased (to about 1 to about 10). Meanwhile, in order to increase percent α content as in the case of Example 7, the ratio $Al_2O_3$/AlN is reduced (to 2 or less). The lower the ratio $Al_2O_3$/AlN, the higher the percent α content.

A pair of insulating-substrate-forming compacts produced from the above-prepared powder mixture were fitted together so as to accommodate the resistor-forming compact therein, and then placed in a die, followed by press molding by means of a pair of punches, to thereby produce an element-forming compact. The element-forming compact was calcined in a nitrogen atmosphere at 600° C. for removing the binder component, and the resultant element-forming compact was subjected to cold isostatic pressing (CIP) at a pressure of 20 to 150 MPa.

Subsequently, the element-forming compact subjected to cold isostatic pressing (CIP) was subjected to pressureless sintering in a nitrogen atmosphere (0.1 MPa) at 1,750° C. for two hours, to thereby produce a heater element including an insulating substrate and a heating resistor embedded therein.

The constituent phase of each of the insulating substrate and the heating resistor of the thus-produced heater element was identified, and percent α content and Z value were determined. The constituent phase was identified through X-ray diffractometry, and percent α content and Z value were determined through the aforementioned methods. Also, there were determined the volume fraction of the silicide in the insulating substrate, and the volume fraction of the electrically conductive compound in the heating resistor. Each volume fraction was determined as follows. Specifically, a cross section of the heater element was mirror-polished; the image of the cross section obtained by means of a scanning electron microscope (SEM) was subjected to image analysis, to thereby calculate the percent area of grains; and the percent theoretical volume was pseudo-calculated on the basis of the percent area. Table 1 shows the above-produced samples and the measurement data thereof.

The insulating substrate of Example 1 is formed of a raw material powder mixture (powder for insulating substrate) containing $Yb_2O_3$ (5.5 wt. %), $Al_2O_3$ (4.5 wt. %), AlN (5.5 wt. %), $WO_3$ (1.8 wt. %), and $Si_3N_4$ (balance), and has a percent α content of 0.15 and a Z value of 0.7. The insulating substrate of Example 3 is formed of a raw material powder mixture containing $Yb_2O_3$ (5.5 wt. %), $Al_2O_3$ (11 wt. %), AlN (5.5 wt. %), $WO_3$ (1.8 wt. %), and $Si_3N_4$ (balance), and has a percent α content of 0 and a Z value of 1. Thus, percent α content and Z value can be adjusted by appropriately varying the proportions of $Al_2O_3$ and AlN.

TABLE 1

| | | | | | Silicide | | Rare earth element of |
| --- | --- | --- | --- | --- | --- | --- | --- |
| | α phase | β phase | β phase Z value | Percent α content | Constituent element | Volume fraction | grain boundary phase |
| Ex. 1 | Yb-α-SiAlON | β-SiAlON | 0.7 | 15% | W | 1 vol % | Yb |
| Ex. 2 | — | β-SiAlON | 0.7 | 0% | W | 1 vol % | Yb |
| Ex. 3 | — | β-SiAlON | 1 | 0% | W | 1 vol % | Yb |
| Ex. 4 | — | β-SiAlON | 1.2 | 0% | W | 1 vol % | Yb |
| Ex. 5 | — | β-SiAlON | 0.4 | 0% | W | 1 vol % | Yb |
| Ex. 6 | Yb-α-SiAlON | β-SiAlON | 0.4 | 50% | W | 1 vol % | Yb |
| Ex. 7 | Yb-α-SiAlON | β-SiAlON | 0.4 | 55% | W | 1 vol % | Yb |
| Ex. 8 | Yb-α-SiAlON | β-SiAlON | 0.7 | 25% | W | 1 vol % | Yb |
| Ex. 9 | Yb-α-SiAlON | β-SiAlON | 0.7 | 25% | W | 1 vol % | Yb |
| Ex. 10 | Yb-α-SiAlON | β-SiAlON | 0.7 | 25% | W | 1 vol % | Yb |
| Ex. 11 | Y-α-SiAlON | β-SiAlON | 0.7 | 13% | W | 1 vol % | Y |
| Ex. 12 | Er-α-SiAlON | β-SiAlON | 0.7 | 12% | W | 1 vol % | Er |
| Ex. 13 | Yb-α-SiAlON | β-SiAlON | 0.7 | 15% | W | 5 vol % | Yb |
| Ex. 14 | — | β-SiAlON | 0.7 | 0% | W | 1 vol % | La |
| Ex. 15 | Y—Yb-α-SiAlON | β-SiAlON | 0.7 | 17% | W | 1 vol % | Y, Yb |
| Ex. 16 | Yb-α-SiAlON | β-SiAlON | 0.7 | 15% | W, Cr | 1 vol % | Yb |
| Ex. 17 | Yb-α-SiAlON | β-SiAlON | 0.7 | 15% | Fe | 1 vol % | Yb |
| Ex. 18 | Yb-α-SiAlON | β-SiAlON | 0.7 | 15% | Cr | 1 vol % | Yb |
| Ex. 19 | Yb-α-SiAlON | β-SiAlON | 0.7 | 15% | Mo | 1 vol % | Yb |
| Ex. 20 | Yb-α-SiAlON | β-SiAlON | 0.7 | 15% | W, V | 1 vol % | Yb |
| Ex. 21 | — | β-SiAlON | 0.4 | 0% | W, Cr | 5 vol % | Yb |
| Ex. 22 | — | β-SiAlON | 0.4 | 0% | W, Cr | 5 vol % | Yb |
| Comp. Ex. 1 | — | β-Si3N4 | 0 | 0% | W | 1 vol % | Yb |
| Comp. Ex. 2 | — | β-SiAlON | 0.4 | 0% | — | 1 vol % | Yb |
| Comp. Ex. 3 | — | β-SiAlON | 0 | 0% | W | 1 vol % | Yb |
| Comp. Ex. 4 | — | β-SiAlON | 0.4 | 0% | W | 1 vol % | Yb |
| Comp. Ex. 5 | — | β-SiAlON | 0.4 | 0% | W | 1 vol % | — |

| | Heating resistor | | | | | | |
| --- | --- | --- | --- | --- | --- | --- | --- |
| | Electrically conductive compound | | | | | | Rare earth element of |
| | Type | Volume fraction | α phase | β phase | β phase Z value | Percent α content | grain boundary phase |
| Ex. 1 | WC | 28 vol % | — | β-SiAlON | 0.2 | 0% | Yb |
| Ex. 2 | WC | 28 vol % | — | β-SiAlON | 0.2 | 0% | Yb |
| Ex. 3 | WC | 28 vol % | — | β-SiAlON | 0.2 | 0% | Yb |
| Ex. 4 | WC | 28 vol % | — | β-SiAlON | 0.2 | 0% | Yb |
| Ex. 5 | WC | 28 vol % | — | β-SiAlON | 0.2 | 0% | Yb |
| Ex. 6 | WC | 28 vol % | — | β-SiAlON | 0.2 | 0% | Yb |
| Ex. 7 | WC | 28 vol % | — | β-SiAlON | 0.2 | 0% | Yb |
| Ex. 8 | WC | 27 vol % | Yb-α-SiAlON | β-SiAlON | 0.2 | 55% | Yb |
| Ex. 9 | WC | 25 vol % | — | β-SiAlON | 0.7 | 0% | Yb |
| Ex. 10 | WC | 25 vol % | — | β-SiAlON | 1.1 | 0% | Yb |
| Ex. 11 | WC | 28 vol % | — | β-SiAlON | 0.2 | 0% | Y |
| Ex. 12 | WC | 28 vol % | — | β-SiAlON | 0.2 | 0% | Er |

TABLE 1-continued

| | | | | | | | |
|---|---|---|---|---|---|---|---|
| Ex. 13 | WC | 28 vol % | — | β-SiAlON | 0.2 | 0% | Yb |
| Ex. 14 | WC | 28 vol % | — | β-SiAlON | 0.2 | 0% | La |
| Ex. 15 | WC | 28 vol % | — | β-SiAlON | 0.2 | 0% | Yb |
| Ex. 16 | WC | 28 vol % | — | β-SiAlON | 0.2 | 0% | Yb |
| Ex. 17 | WC | 28 vol % | — | β-SiAlON | 0.2 | 0% | Yb |
| Ex. 18 | WC | 28 vol % | — | β-SiAlON | 0.2 | 0% | Yb |
| Ex. 19 | WC | 28 vol % | — | β-SiAlON | 0.2 | 0% | Yb |
| Ex. 20 | WC | 28 vol % | — | β-SiAlON | 0.2 | 0% | Yb |
| Ex. 21 | MoSi2 | 28 vol % | — | β-SiAlON | 0.2 | 0% | Yb |
| Ex. 22 | WSi2 | 24 vol % | — | β-SiAlON | 0.2 | 0% | Yb |
| Comp. Ex. 1 | WC | 28 vol % | — | β-Si3N4 | 0 | 0% | Yb |
| Comp. Ex. 2 | WC | 28 vol % | — | β-SiAlON | 0.2 | 0% | Yb |
| Comp. Ex. 3 | WC | 28 vol % | — | β-Si3N4 | 0 | 0% | Yb |
| Comp. Ex. 4 | TiN | 28 vol % | — | β-SiAlON | 0.2 | 0% | Yb |
| Comp. Ex. 5 | WC | 28 vol % | — | β-SiAlON | 0.2 | 0% | — |

Each insulating substrate was evaluated in terms of fracture toughness. Also, each heater element was evaluated in terms of strength, electric power consumption, rapid heating ability, continuous energization durability (oxidation resistance), and ON/OFF durability. The results are shown in Table 2.

The fracture toughness of each insulating substrate was measured according to JIS R1607. For evaluation of the strength of each heater element, the three-point bending strength thereof was measured according to JIS R1601 (span: 12 mm, cross head speed: 0.5 mm/minute). The electric power consumption of each heater element was measured at 1,200° C. (during saturation). For evaluation of rapid heating ability, a DC voltage of 11 V was applied to each heater element, and the time required for the temperature of the front end of the heater element to reach 1,000° C. was measured.

For evaluation of continuous energization durability, each heater element was subjected to a continuous energization test in which the heater element was heated so as to attain a maximum surface temperature of 1,250° C. or 1,300° C. The continuous energization test was carried out for 1,000 hours. The resistance of the heater element was measured before and after the test, and a change in resistance was determined. After measurement of the resistance, the heater element was cut in an axial direction and then mirror-polished. By means of EPMA, a portion of the heater element in the vicinity of the heating resistor was observed for determining migration of sintering aid components (e.g., rare earth element and aluminum). In this case, when no change in resistance occurred, and no migration was observed, rating "AA" was assigned; when virtually no change in resistance occurred, but migration was observed, rating "BB" was assigned; and when resistance increased by 10% or more, and migration was observed, rating "CC" was assigned.

For evaluation of oxidation resistance, each heater element was allowed to stand in a heating furnace (air atmosphere) at 1,250° C. or 1,300° C. for 50 hours, and the weight of the heater element was measured before and after the treatment in the furnace, to thereby determine an increase in weight by oxidation. The increase in weight by oxidation was determined by dividing, by surface area, the difference between the weight after the treatment in the furnace and the weight before the treatment in the furnace. When the increase in weight by oxidation was 0.3 mg/cm$^2$ or less at 1,250° C. or 0.4 mg/cm$^2$ or less at 1,300° C., the heater element was evaluated as having excellent oxidation resistance, and rating "AA" was assigned. In contrast, when the increase in weight by oxidation was more than 0.3 mg/cm$^2$ at 1,250° C. or more than 0.4 mg/cm$^2$ at 1,300° C., the heater element was regarded as being oxidized (corresponding to "Surface oxidation" shown in Table 2).

For evaluation of ON/OFF durability, each heater element was subjected to cycles of thermal treatment, each cycle including application of such a voltage that the temperature of the heater element reaches 1,000° C. in two seconds; application of the voltage so as to attain a maximum temperature of 1,250° C.; stopping of application of the voltage; and cooling by means of a fan for 30 seconds. There was counted the number of cycles by which the resistance after thermal treatment changed by 10% or more with respect to that before thermal treatment. In Table 2, the symbols "SS," "AA," and "BB" correspond to the cases where a change in resistance was less than 10% until 100,000 cycles, 20,000 cycles, and 500 cycles of thermal treatment, respectively. The symbol "CC" corresponds to the case where disconnection occurred through less than 500 cycles of thermal treatment.

TABLE 2

| | Fracture toughness of insulating substrate | Strength | Electric power consumption | Rapid heating ability | Continuous energization durability (oxidation resistance) | | ON/OFF durability |
|---|---|---|---|---|---|---|---|
| | [MPa√m] | [MPa] | [W] | [s] | 1,250° C. | 1,300° C. | 1,250° C. |
| Ex. 1 | 5.0 | 820 | 35 | 1.6 | AA | AA | SS |
| Ex. 2 | 5.0 | 1020 | 35 | 1.6 | AA | Surface oxidation | SS |
| Ex. 3 | 4.0 | 610 | 36 | 1.7 | AA | Surface oxidation | AA |
| Ex. 4 | 4.0 | 550 | 37 | 1.6 | AA | Surface oxidation | BB |
| Ex. 5 | 5.0 | 900 | 38 | 1.8 | AA | Surface oxidation | AA |
| Ex. 6 | 5.0 | 610 | 38 | 1.8 | AA | AA | AA |
| Ex. 7 | 5.0 | 550 | 38 | 1.8 | AA | AA | BB |

TABLE 2-continued

| | Fracture toughness of insulating substrate [MPa√m] | Strength [MPa] | Electric power consumption [W] | Rapid heating ability [s] | Continuous energization durability (oxidation resistance) 1,250° C. | Continuous energization durability (oxidation resistance) 1,300° C. | ON/OFF durability 1,250° C. |
|---|---|---|---|---|---|---|---|
| Ex. 8 | 5.0 | 550 | 39 | 2 | AA | AA | BB |
| Ex. 9 | 5.0 | 700 | 39 | 1.9 | AA | AA | AA |
| Ex. 10 | 5.0 | 560 | 41 | 2 | AA | AA | BB |
| Ex. 11 | 5.0 | 790 | 35 | 1.6 | AA | Surface oxidation | SS |
| Ex. 12 | 5.0 | 780 | 35 | 1.6 | AA | AA | SS |
| Ex. 13 | 5.2 | 690 | 36 | 1.7 | AA | AA | AA |
| Ex. 14 | 5.1 | 570 | 36 | 1.8 | AA | Surface oxidation | BB |
| Ex. 15 | 5.0 | 840 | 35 | 1.6 | AA | Surface oxidation | SS |
| Ex. 16 | 5.0 | 800 | 34 | 1.7 | AA | AA | SS |
| Ex. 17 | 5.2 | 750 | 36 | 1.7 | AA | AA | SS |
| Ex. 18 | 5.2 | 750 | 36 | 1.7 | AA | AA | SS |
| Ex. 19 | 5.2 | 750 | 36 | 1.7 | AA | AA | SS |
| Ex. 20 | 5.2 | 750 | 35 | 1.6 | AA | AA | SS |
| Ex. 21 | 5.3 | 630 | 38 | 2 | AA | AA | BB |
| Ex. 22 | 5.3 | 630 | 39 | 2 | AA | AA | BB |
| Comp. Ex. 1 | 5.5 | 1000 | 49 | 2.5 | Surface oxidation | Surface oxidation | BB |
| Comp. Ex. 2 | 4.5 | 510 | 39 | 1.9 | AA | Surface oxidation | CC |
| Comp. Ex. 3 | Not evaluated due to cutting of heating resistor | | | | | | |
| Comp. Ex. 4 | Not evaluated due to cutting of heating resistor | | | | | | |
| Comp. Ex. 5 | Not densified | | | | | | |

As is clear from the data in Tables 1 and 2, the heater element of Comparative Example 1—in which each of the insulating substrate and the heating resistor contains a main phase formed of silicon nitride—consumes more electric power, has poor rapid heating ability, and exhibits insufficient oxidation resistance. The data also show that the heater element of Comparative Example 2, in which the insulating substrate does not contain a specific silicide, exhibits insufficient ON/OFF durability, since the insulating substrate and the heating resistor have different thermal expansion coefficients. The data also show that the heating resistor is cut during sintering in the heater element of Comparative Example 3, in which only the insulating substrate contains a main phase formed of SiAlON, or in the heating element of Comparative Example 4, in which the heating resistor contains TiN as an electrically conductive compound, and that densification is insufficient in the heater element of Comparative Example 5, which contains no rare earth element.

In contrast, the heater elements of the Examples consume less electric power, and exhibit favorable rapid heating ability and sinterability. The data show that, in these heater elements, cutting or breakage of the heating resistor is suppressed during sintering, and occurrence of exfoliation, etc. is suppressed at the interface between the insulating substrate and the heating resistor.

Particularly, as shown in the data of the heater elements of Examples 7 and 8, when the percent α content of the insulating substrate or the heating resistor exceeds 0.5, the grain boundary phase component is incorporated into SiAlON during sintering, and virtually no grain boundary phase component remains, resulting in failure to form a dense sintered compact. As a result, strength and ON/OFF durability are likely to be impaired. Therefore, the percent α content of the insulating substrate or the heating resistor is preferably 0.5 or less. Meanwhile, as shown in the data of the heater elements of Examples 2 to 5, when the percent α content of the insulating substrate is 0, the grain boundary phase component remains in a large amount, and oxidation resistance is likely to be impaired. Therefore, the percent α content of the insulating substrate is preferably more than 0, more preferably 5% or more. The data of all the Examples show that the percent α content of the insulating substrate is preferably greater than that in the heating resistor.

As shown in the data of the heater element of Example 4, when the Z value in the insulating substrate exceeds 1, strength is lowered, and ON/OFF durability is likely to be impaired. Therefore, the Z value in the insulating substrate is preferably 1 or less. Similarly, as shown in the data of the heater element of Example 10, when the Z value in the heating resistor exceeds 1, the strength of the heating resistor is lowered, and thus ON/OFF durability is likely to be impaired. Therefore, the Z value in the heating resistor is preferably 1 or less.

As shown in the data of the heater element of Example 14, even when La is employed as a rare earth element, sufficient effects are obtained. However, from the viewpoint of ON/OFF durability, Y, Yb, or Er is preferably employed. Meanwhile, from the viewpoints of ON/OFF durability and oxidation resistance, Yb or Er is more preferably employed as a rare earth element. Also, as shown in the data of the heater element of Example 13, when the volume fraction of the silicide contained in the insulating substrate is 5 vol. % or more, strength is likely to be lowered. Therefore, the volume fraction is preferably, for example, 4 vol. % or less. Also, as shown in the data of the heater elements of Examples 15 to 21, the insulating substrate may contain a silicide other than silicide of W, or may contain two or more silicides.

Examples 23 to 29

Heater elements including insulating substrates having different percent α contents were produced through the basically same production method as described in the aforementioned Examples (see Table 3). Percent α content was adjusted by varying the compositional proportions of raw material powders, and regulating sintering conditions. The heater element of Example 26 is the same as that of Example 1; the heater element of Example 28 is the same as that of Example 6; and the heater element of Example 29 is the same as that of Example 7.

Thereafter, the insulating substrate of each of the thus-produced heater elements was evaluated in terms of fracture toughness. Also, each heater element was evaluated in terms of strength, continuous energization durability (oxidation resistance), and ON/OFF durability. For evaluation of continuous energization durability (oxidation resistance), the temperature was changed to 1,350° C. For evaluation of ON/OFF durability, the maximum temperature was changed to 1,300° C. Specifically, each heater element was subjected to cycles of thermal treatment, each cycle including application of such a voltage that the temperature of the heater element reaches 1,000° C. in two seconds; application of the voltage so as to attain a maximum temperature of 1,300° C.; stopping of application of the voltage; and cooling by means of a fan for 30 seconds. The results are shown in Table 4.

TABLE 3

| | Insulating substrate | | | | Heating resistor | | | | | | | |
|---|---|---|---|---|---|---|---|---|---|---|---|---|
| | | | | | Silicide | | Electrically conductive compound | | | | | Rare earth element |
| | α phase | β phase | β phase Z value | Percent α content | Constituent element | Volume fraction | Type | Volume fraction | α phase | β phase | β phase Z value | Percent α content | of grain boundary phase |
| Example 23 | — | β-SiAlON | 1 | 0% | W | 1 vol % | WC | 28 vol % | — | β-SiAlON | 0.2 | 0% | Yb |
| Example 24 | Yb-α-SiAlON | β-SiAlON | 0.8 | 2% | W | 1 vol % | WC | 28 vol % | — | β-SiAlON | 0.2 | 0% | Yb |
| Example 25 | Yb-α-SiAlON | β-SiAlON | 0.7 | 5% | W | 1 vol % | WC | 28 vol % | — | β-SiAlON | 0.2 | 0% | Yb |
| Example 26 | Yb-α-SiAlON | β-SiAlON | 0.7 | 15% | W | 1 vol % | WC | 28 vol % | — | β-SiAlON | 0.2 | 0% | Yb |
| Example 27 | Yb-α-SiAlON | β-SiAlON | 0.5 | 30% | W | 1 vol % | WC | 28 vol % | — | β-SiAlON | 0.2 | 0% | Yb |
| Example 28 | Yb-α-SiAlON | β-SiAlON | 0.4 | 50% | W | 1 vol % | WC | 28 vol % | — | β-SiAlON | 0.2 | 0% | Yb |
| Example 29 | Yb-α-SiAlON | β-SiAlON | 0.4 | 55% | W | 1 vol % | WC | 28 vol % | — | β-SiAlON | 0.2 | 0% | Yb |

TABLE 4

| | Fracture toughness of insulating substrate [MPa√m] | Strength [MPa] | Continuous energization durability (oxidation resistance) 1,350° C. | ON/OFF durability 1,300° C. |
|---|---|---|---|---|
| Example 23 | 5.2 | 610 | Surface oxidation | BB |
| Example 24 | 5.0 | 800 | AA | AA |
| Example 25 | 5.1 | 805 | AA | SS |
| Example 26 | 5.2 | 820 | AA | SS |
| Example 27 | 5.0 | 775 | AA | SS |
| Example 28 | 5.0 | 610 | AA | BB |
| Example 29 | 5.0 | 550 | AA | BB |

When the percent α content of the insulating substrate is 2% or more, the amount of the grain boundary phase in the insulating substrate is reduced, and thus oxidation resistance can be secured. Meanwhile, when the percent α content of the insulating substrate is 30% or less, a dense sintered compact can be formed, and strength and durability against repeated temperature elevation can be secured.

DESCRIPTION OF REFERENCE NUMERALS

1: glow plug
2: ceramic heater
3: metallic shell
10: ceramic heater element (10a: element-forming compact)
11: metallic sheath
101: insulating substrate (101a: insulating-substrate-forming compact)
102: heating resistor (102a: resistor-forming compact)

The invention claimed is:

1. A ceramic heater element comprising an insulating substrate, and a heating resistor embedded in the insulating substrate, characterized in that:

the insulating substrate contains a main phase formed of β-SiAlON or a multiphase SiAlON of β-SiAlON and α-SiAlON; a grain boundary phase containing a rare earth element; and a silicide of at least one species selected from among Cr, W, Mo, V, and Fe; and the heating resistor contains a main phase formed of an electrically conductive compound containing at least one species selected from among silicide, nitride, and carbide of Mo, and silicide, nitride, and carbide of W; β-SiAlON or a multiphase SiAlON of β-SiAlON and α-SiAlON; and a grain boundary phase containing a rare earth element, wherein the SiAlON phase contained in the insulating substrate or the heating resistor has a percent α content of 50% or less, wherein β-SiAlON contained in the insulating substrate or the heating resistor has a Z value of more than 0 and 1 or less, and wherein the rare earth element contained in the insulating substrate contains at least one species selected from among Y, Er, and Yb, and the rare earth element contained in the heating resistor contains at least one species selected from among Y, Er, and Yb.

2. A ceramic heater element according to claim 1, wherein the SiAlON phase contained in the insulating substrate has a percent α content of 2% to 30%.

3. A ceramic heater comprising a ceramic heater element, and a metallic sheath including therein the ceramic heater element such that the front end of the ceramic heater element projects from the metallic sheath, characterized in that:

the ceramic heater element is a ceramic heater element as recited in claim 1.

4. A glow plug comprising a ceramic heater, and a tubular metallic shell including therein a rear end portion of the ceramic heater, characterized in that:

the ceramic heater is a ceramic heater as recited in claim 3.

* * * * *